(12) United States Patent
Li et al.

(10) Patent No.: US 12,308,893 B2
(45) Date of Patent: May 20, 2025

(54) CALIBRATION CIRCUIT AND CALIBRATION METHOD OF WIRELESS TRANSCEIVER

(71) Applicant: REALTEK SEMICONDUCTOR CORPORATION, Hsinchu (TW)

(72) Inventors: Meng-Che Li, Hsinchu (TW); Chien-Jung Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 420 days.

(21) Appl. No.: 17/983,142

(22) Filed: Nov. 8, 2022

(65) Prior Publication Data

US 2023/0155696 A1 May 18, 2023

(30) Foreign Application Priority Data

Nov. 12, 2021 (TW) ................................ 110142238

(51) Int. Cl.
*H04B 17/00* (2015.01)
*H04B 17/11* (2015.01)
*H04B 17/21* (2015.01)

(52) U.S. Cl.
CPC ............. *H04B 17/11* (2015.01); *H04B 17/21* (2015.01)

(58) Field of Classification Search
CPC ........ H04B 17/11; H04B 17/21; H04B 17/24; H04B 17/25; H04B 17/328; H04B 1/525
See application file for complete search history.

(56) References Cited

U.S. PATENT DOCUMENTS 8,699,972 B2    4/2014 Lee
9,144,042 B2 *  9/2015 Damavandi ........... H04W 52/52
(Continued)

FOREIGN PATENT DOCUMENTS

CN    100386973 C    5/2008
CN      1666449 B    3/2012
CN    103931121 B    1/2016

OTHER PUBLICATIONS

1) OA letter of a counterpart TW application (appl. No. 110142238) mailed on May 31, 2022. 2) Summary of the TW OA letter in regard to the TW counterpart application: (1) Claim(s) 1, 4-6, and 9-10 is/are rejected under Patent Law Article 22(2) as being unpatentable over reference 1 (CN 1666449B) and reference 2 (CN 103931121B). (2) Claim(s) 2-3 and 7-8 is/are rejected under Patent Law Article 22(2) as being unpatentable over reference 1 (CN100386973C).

*Primary Examiner* — Tuan Pham
(74) *Attorney, Agent, or Firm* — WPAT, PC

(57) ABSTRACT

A calibration circuit and a calibration method for a wireless transceiver are provided. The wireless transceiver includes a transmission path and a reception path, and the transmission path includes a radio frequency (RF) circuit and a baseband amplifier. The calibration method includes the following steps: setting a target gain of the RF circuit according to a first gain setting value; receiving a first input signal through a coupling path and the reception path; measuring first power of the first input signal; setting the target gain of the RF circuit according to a second gain setting value; receiving a second input signal through the coupling path and the reception path; measuring second power of the second input signal; calculating a power difference between the first power and the second power; and adjusting at least one of the baseband amplifier and a digital circuit according to the power difference.

10 Claims, 3 Drawing Sheets

(56) References Cited

U.S. PATENT DOCUMENTS

| | | | |
|---|---|---|---|
| 9,379,826 B2* | 6/2016 | Langer | H04B 17/11 |
| 9,793,871 B1* | 10/2017 | Kim | H04B 1/0475 |
| 2007/0129031 A1 | 6/2007 | Newton | |
| 2022/0109513 A1 | 4/2022 | Huang | |

* cited by examiner

| N$^{th}$ iteration | first gain setting value | second gain setting value |
|---|---|---|
| 1 | GA1 | GA2 |
| 2 | GA2 | GA3 |
| 3 | GA3 | GA4 |

FIG. 3

CALIBRATION CIRCUIT AND CALIBRATION METHOD OF WIRELESS TRANSCEIVER

BACKGROUND OF THE INVENTION

1. Field of the Invention

The present invention generally relates to wireless transceivers, and, more particularly, to a calibration circuit and a calibration method for the wireless transceivers.

2. Description of Related Art

The transmitter of a wireless transceiver has a need of adjusting the power linearly, and a power setting value of the transmitter corresponds to the combination of the gains of several circuits (e.g., the power amplifier, the mixers). However, radio frequency (RF) analog circuits are not as accurate as digital circuits. In addition, the process variation and circuit board layout differences (impedance changes) are also the factors that the transmitter of the wireless transceiver cannot reach the desired power using the existing power setting values in practical operations. Therefore, calibration circuits and calibration methods are needed to calibrate the wireless transceiver.

SUMMARY OF THE INVENTION

In view of the issues of the prior art, an object of the present invention is to provide a calibration circuit and calibration method for the wireless transceivers, so as to make an improvement to the prior art.

According to one aspect of the present invention, a method for calibrating a wireless transceiver is provided. The wireless transceiver includes a transmission path and a reception path. The transmission path includes a radio frequency (RF) circuit and a baseband amplifier. The method includes the following steps: (A) setting a target gain of the RF circuit according to a first gain setting value; (B) receiving a first input signal through a coupling path and the reception path; (C) measuring first power of the first input signal; (D) setting the target gain of the RF circuit according to a second gain setting value; (E) receiving a second input signal through the coupling path and the reception path; (F) measuring second power of the second input signal; (G) calculating a power difference between the first power and the second power; and (H) adjusting at least one of the baseband amplifier and a digital circuit according to the power difference.

According to another aspect of the present invention, a circuit for calibrating a wireless transceiver is provided. The wireless transceiver includes a transmission path and a reception path. The transmission path includes a radio frequency (RF) circuit and a baseband amplifier. The circuit is configured to performing following steps for calibrating the wireless transceiver: (A) setting a target gain of the RF circuit according to a first gain setting value; (B) receiving a first input signal through a coupling path and the reception path; (C) measuring first power of the first input signal; (D) setting the target gain of the RF circuit according to a second gain setting value; (E) receiving a second input signal through the coupling path and the reception path; (F) measuring second power of the second input signal; (G) calculating a power difference between the first power and the second power; and (H) adjusting at least one of the baseband amplifier and a digital circuit according to the power difference.

According to the present invention, the calibration circuit and calibration method for the wireless transceivers can calibrate the transmission power of the wireless transceiver to overcome the power error caused by the process variation and the differences in circuit board layout.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 3 is an example of the first gain setting values and the second gain setting values in several iterations of the calibration method according to an embodiment of the present invention.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a circuit and method for calibrating wireless transceivers. On account of that some or all elements of the wireless transceiver could be known, the detail of such elements is omitted provided that such detail has little to do with the features of this disclosure, and that this omission nowhere dissatisfies the specification and enablement requirements. Some or all of the processes of the method of calibrating the wireless transceivers may be implemented by software and/or firmware and can be performed by the circuit for calibrating the wireless transceivers or its equivalent. A person having ordinary skill in the art can choose components or steps equivalent to those described in this specification to carry out the present invention, which means that the scope of this invention is not limited to the embodiments in the specification.

Figure 1:
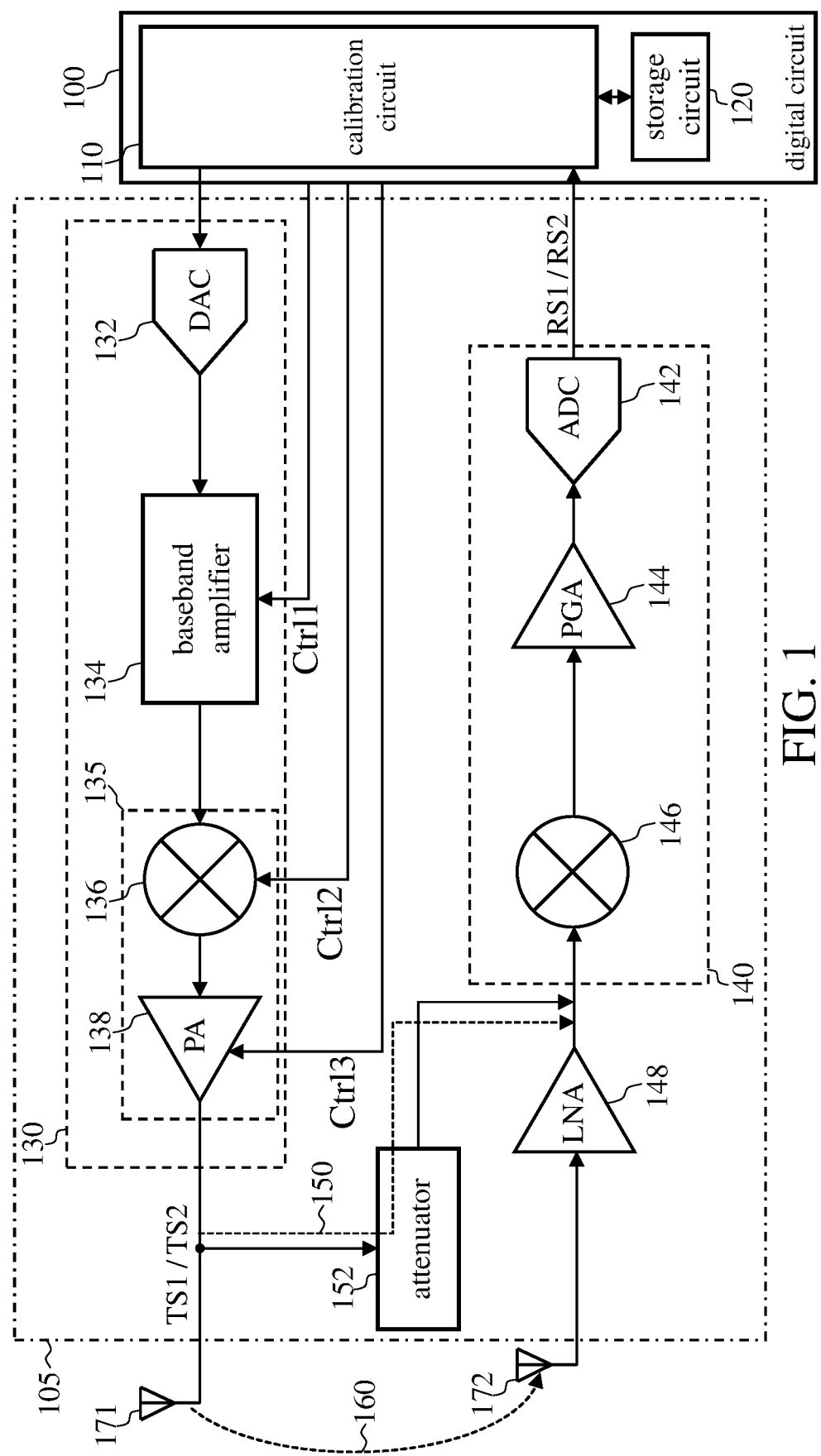
FIG. 1 is a functional block diagram of a wireless transceiver and a calibration circuit therefor according to an embodiment of the present invention.

FIG. 1 is a functional block diagram of the wireless transceiver and its calibration circuit of the present invention. The digital circuit 100 includes a calibration circuit 110 and a storage circuit 120. The wireless transceiver 105 includes a transmission path 130 and a reception path 140. The transmission path 130 is coupled to the antenna 171, and the reception path 140 is coupled to the antenna 172. The wireless transceiver 105 transmits an output signal (e.g., the first output signal TS1 or the second output signal TS2, transmitted via the antenna 171) through the transmission path 130 and receives the input signal (e.g., the first input signal RS1 or the second input signal RS2, received via the antenna 172 or the attenuator 152) through the reception path 140. The transmission path 130 includes a digital-to-analog converter (DAC) 132, a baseband amplifier 134, and an RF circuit 135 which includes a mixer 136 and a power amplifier (PA) 138. In some embodiments, the reception path 140 includes an analog-to-digital converter (ADC) 142, a programmable gain amplifier (PGA) 144, and a mixer 146. In other embodiments, the reception path 140 further includes a low-noise amplifier (LNA) 148. The operating principle of the wireless transceiver 105 and the function of each component are well known to people having ordinary skill in the art, and the details are thus omitted for brevity.

The gain g1 of the baseband amplifier 134, the gain g2 of the mixer 136, and the gain g3 of the PA 138 are adjustable. The digital circuit 100 can adjust or set the gain g1, the gain g2, and the gain g3 through the control signal Ctrl1, the control signal Ctrl2, and the control signal Ctrl3 respectively. The adjustment of the gain g1 of the baseband amplifier 134, the adjustment of the gain g2 of the mixer 136, and the adjustment of the gain g3 of the PA 138 are well known to people having ordinary skill in the art, and the details thus are thus omitted for brevity. The target gain of the RF circuit 135 is the product of the gain g2 and the gain g3.

The factors of the overall gain of the transmission path 130 include the gain g1, the gain g2, and the gain g3. In other words, the overall gain of the transmission path 130 can be adjusted by adjusting any one of the gain g1, the gain g2, and the gain g3. The digital circuit 100 sets the overall gain of the transmission path 130 according to gain setting values (which can be stored in the storage circuit 120), and each gain setting value corresponds to a target gain of the RF circuit 135 (i.e., corresponding to a combination of the gain g2 and the gain g3). In the following discussions, it is assumed that the storage circuit 120 stores four gain setting values: GA1, GA2, GA3, and GA4.

Figure 2:
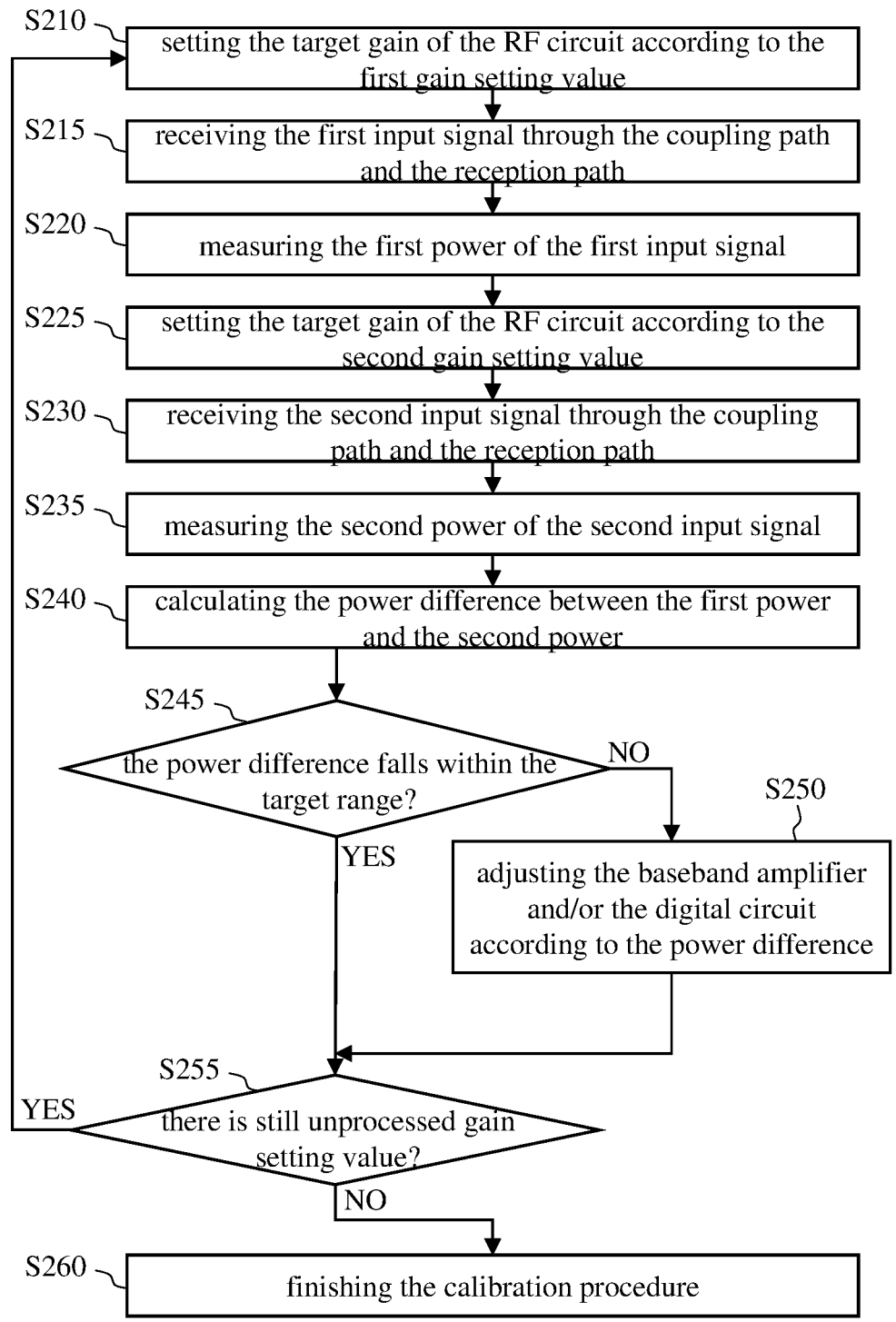
FIG. 2 is a flowchart of a calibration method for a wireless transceiver according to an embodiment of the present invention.

FIG. 2 is a flowchart of a calibration method for a wireless transceiver according to an embodiment of the present invention. Reference is made to both FIG. 1 and FIG. 2 for the following discussions.

Step S210: The calibration circuit 110 sets the target gain of the RF circuit 135 according to the first gain setting value. When the flow of FIG. 2 is executed for the first time, the first gain setting value is one of GA1, GA2, GA3, and GA4. The frequency response of the first output signal TS1 is dependent on the first gain setting value. In this step, the calibration circuit 110 sets the parameter(s) of the mixer 136 through the control signal Ctrl2, and sets the parameter(s) of the PA 138 through the control signal Ctrl3.

Step S215: The calibration circuit 110 receives the first input signal RS1 through the coupling path 150 (or 160) and the reception path 140. The first output signal TS1 passes through the coupling path 150 (or 160) and the reception path 140 and then becomes the first input signal RS1. The coupling path 150, which is a wired path in the wireless transceiver 105, is coupled between the output end of the PA 138 and the input end of the mixer 146. In other words, the first output signal TS1 is coupled or inputted to the mixer 146 through the coupling path 150. The coupling path 150 includes an attenuator 152 that attenuates the first output signal TS1 to prevent the mixer 146 from receiving a signal that is too high in power. When the calibration circuit 110 receives the first input signal RS1 through the coupling path 150, the calibration circuit 110 connects the input terminal of the LNA 148 to ground and/or disables the LNA 148. The coupling path 160 is a wireless path, that is, a wireless transmission between the antenna 171 and the antenna 172.

Step S220: The calibration circuit 110 measures the first power P1 of the first input signal RS1. Since people having ordinary skill in the art know how to measure the power of a signal in the digital domain, the details are omitted for brevity. The calibration circuit 110 records the measured first power P1.

Step S225: The calibration circuit 110 sets the target gain of the RF circuit 135 according to the second gain setting value. Step S225 is similar to step S210, but the second gain setting value is different from the first gain setting value. For example, when the first gain setting value is GA1, the second gain setting value is GA2. The frequency response of the second output signal TS2 is dependent on the second gain setting value.

Step S230: The calibration circuit 110 receives the second input signal RS2 through the coupling path 150 (or 160) and the reception path 140. Step S230 is similar to step S215. The second output signal TS2 passes through the coupling path 150 (or 160) and the reception path 140 and then becomes the second input signal RS2.

Step S235: The calibration circuit 110 measures the second power P2 of the second input signal RS2. Step S235 is similar to step S220.

Step S240: The calibration circuit 110 calculates the power difference between the first power P1 and the second power P2.

Step S245: The calibration circuit 110 determines whether the power difference falls within the target range. More specifically, assuming that the ideal power corresponding to the first gain setting value is Pi1, and the ideal power corresponding to the second gain setting value is Pi2, the lower limit and upper limit of the target range can be R1*|Pi1−Pi2| and R2*|Pi1−Pi2| (R1<R2, for example, R1=0.8 and R2=1.2). Ideally, the power difference obtained in step S240 is equal to |Pi1−Pi2|. Therefore, a large difference between the power difference |P1−P2| and the ideal difference |Pi1−Pi2| (i.e., the power error being too large) is implied when the power difference |P1−P2| does not fall within the target range (i.e., the result of step S245 is NO).

Step S250: The calibration circuit 110 adjusts the baseband amplifier 134 and/or the digital circuit 100 according to the power difference. The calibration circuit 110 can calibrate or compensate for the gain of the RF circuit (e.g., calibrates or compensates for the gain gap between the first gain setting value and the second gain setting value) in the analog domain (i.e., adjusting the gain of the baseband amplifier 134 through the control signal Ctrl1) and/or in the digital domain (i.e., adjusting the gain of the digital circuit 100). In some embodiments, the purpose of calibration or compensation can be achieved by adjusting one of the baseband amplifier 134 and the digital circuit 100. Adjusting the gain in the digital domain is well known to people having ordinary skill in the art, and the details are thus omitted for brevity.

Step S255: The calibration circuit 110 determines whether there is still unprocessed gain setting value. When the result of step S255 is YES, the calibration circuit 110 performs step S210 to continue iteration; when the result of step S255 is NO, the calibration circuit 110 finishes the calibration procedure (step S260).

When the calibration circuit 110 performs the iteration (i.e., steps S210 to S255 are performed again), the calibration circuit 110 uses the second gain setting value in the previous iteration as the first gain setting value in the current iteration (e.g., continuing the above example, using GA2 as the first gain setting value), and the gain setting value next to the second gain setting value in the previous iteration is used as the second gain setting value in the current iteration (e.g., continuing the above example, GA3 is used as the second gain setting value). For example, when the storage circuit 120 stores four gain setting values (GA1, GA2, GA3, GA4), the first gain setting value and the second gain setting value in each iteration are shown in FIG. 3. When the calibration circuit 110 performs step S255 for the second time, the result of step S255 is YES (i.e., the third iteration is required) because the gain setting value GA4 is not processed yet. When the calibration circuit 110 performs step S255 for the third time, the result of step S255 is NO because there is no unprocessed gain setting value.

As shown in FIG. 3, a total of four gain setting values (GA1, GA2, GA3, GA4) are sequentially processed in three iterations. Therefore, N iterations sequentially process N+1 gain setting values, N being an integer greater than 1. In some embodiments, the sequentially processed gain setting values (GA1, GA2, GA3, . . . ) are arranged in ascending or descending order (i.e., the gains corresponding to the gain setting values are arranged in order). In this way, when the calibration process of FIG. 2 is finished, the gain of the RF circuit 135 becomes more linear.

In some embodiments, the gain setting values are arranged in descending order (i.e., GA1>GA2>GA3 . . . ). In step S250, when the power difference |P1−P2| is smaller than R1*|Pi1−Pi2| (indicating that P2 is too large), the calibration circuit 110 compensates for the gain gap by decreasing the gain of the baseband amplifier 134 and/or the digital circuit 100; conversely, when the power difference |P1−P2| is greater than R2*|Pi1−Pi2| (indicating that P2 is too small), the calibration circuit 110 compensates for the gain gap by increasing the gain of the baseband amplifier 134 and/or the digital circuit 100.

In other embodiments, the gain setting values are arranged in ascending order (i.e., GA1<GA2<GA3 . . . ). In step S250, when the power difference |P1−P2| is smaller than R1*|Pi1−Pi2| (indicating that P2 is too small), the calibration circuit 110 compensates for the gain gap by increasing the gain of the baseband amplifier 134 and/or the digital circuit 100; conversely, when the power difference |P1−P2| is greater than R2*|Pi1−Pi2| (indicating that P2 is too large), the calibration circuit 110 compensates for the gain gap by decreasing the gain of the baseband amplifier 134 and/or the digital circuit 100.

In some embodiments, the calibration circuit 110 may be a circuit or electronic component with program execution capability, such as a central processing unit (CPU), a microprocessor, a micro-controller, a micro-processing unit, a digital signal processor (DSP) or their equivalents. The calibration circuit 110 performs the steps of FIG. 2 by executing the program codes or program instructions stored in the storage circuit 120. In other embodiments, people having ordinary skill in the art can design the calibration circuit 110 according to the above discussions, that is, the calibration circuit 110 can be a finite-state machine (FSM), an application specific integrated circuit (ASIC) or can be implemented by circuits or hardware such as a programmable logic device (PLD).

Please note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method for calibrating a wireless transceiver that includes a transmission path and a reception path, the transmission path includes a radio frequency (RF) circuit and a baseband amplifier, the method comprising:
   (A) setting a target gain of the RF circuit according to a first gain setting value;
   (B) receiving a first input signal through a coupling path and the reception path;
   (C) measuring first power of the first input signal;
   (D) setting the target gain of the RF circuit according to a second gain setting value;
   (E) receiving a second input signal through the coupling path and the reception path;
   (F) measuring second power of the second input signal;
   (G) calculating a power difference between the first power and the second power; and
   (H) adjusting at least one of the baseband amplifier and a digital circuit according to the power difference.

2. The method of claim 1 further comprising:
   iterating step (A) to step (H);
   wherein the first gain setting value of step (A) in a second iteration is the second gain setting value of step (D) in a first iteration prior to the second iteration.

3. The method of claim 2, wherein step (A) to step (H) are performed N times where N+1 gain setting values are processed in sequence, N being an integer greater than 1, and gains corresponding to the N+1 gain setting values are arranged in ascending or descending order.

4. The method of claim 1, wherein the coupling path is coupled between the transmission path and the reception path and comprises an attenuator.

5. The method of claim 1, wherein the transmission path is coupled to a first antenna, the reception path is coupled to a second antenna, and the coupling path is a wireless transmission between the first antenna and the second antenna.

6. A circuit for calibrating a wireless transceiver that includes a reception path and a transmission path including a radio frequency (RF) circuit and a baseband amplifier, the circuit is configured to performing following steps for calibrating the wireless transceiver:
   (A) setting a target gain of the RF circuit according to a first gain setting value;
   (B) receiving a first input signal through a coupling path and the reception path;
   (C) measuring first power of the first input signal;
   (D) setting the target gain of the RF circuit according to a second gain setting value;
   (E) receiving a second input signal through the coupling path and the reception path;
   (F) measuring second power of the second input signal;
   (G) calculating a power difference between the first power and the second power; and
   (H) adjusting at least one of the baseband amplifier and a digital circuit according to the power difference.

7. The circuit of claim 6 further performing following steps:
   iterating step (A) to step (H);

wherein the first gain setting value of step (A) in a second iteration is the second gain setting value of step (D) in a first iteration prior to the second iteration.

8. The circuit of claim 7, wherein step (A) to step (H) are performed N times where N+1 gain setting values are processed in sequence, N being an integer greater than 1, and gains corresponding to the N+1 gain setting values are arranged in ascending or descending order.

9. The circuit of claim 6, wherein the coupling path is coupled between the transmission path and the reception path and comprises an attenuator.

10. The circuit of claim 6, wherein the transmission path is coupled to a first antenna, the reception path is coupled to a second antenna, and the coupling path is a wireless transmission between the first antenna and the second antenna.

* * * * *